United States Patent

Fromme et al.

(10) Patent No.: US 10,353,832 B2
(45) Date of Patent: Jul. 16, 2019

(54) METHOD FOR THE PARALLEL MANAGEMENT OF CONTINUOUS AND TASK-SYNCHRONOUS INPUT DATA OF A REAL-TIME SYSTEM

(71) Applicant: dSPACE digital signal processing and control engineering GmbH, Paderborn (DE)

(72) Inventors: Matthias Fromme, Hoevelhof (DE); Jochen Sauer, Brakel (DE); Matthias Schmitz, Delbrueck (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

(21) Appl. No.: 15/995,711

(22) Filed: Jun. 1, 2018

(65) Prior Publication Data

US 2018/0357186 A1    Dec. 13, 2018

(30) Foreign Application Priority Data

Jun. 9, 2017    (EP) .................................... 17175193

(51) Int. Cl.
    *G06F 13/42*    (2006.01)
    *G06F 13/12*    (2006.01)
    *G06F 13/10*    (2006.01)
    *G06F 9/48*     (2006.01)
    (Continued)

(52) U.S. Cl.
    CPC ........ *G06F 13/126* (2013.01); *G06F 9/44505* (2013.01); *G06F 9/4843* (2013.01);
    (Continued)

(58) Field of Classification Search
    CPC . G06F 13/4243; G06F 13/126; G06F 15/7867
    See application file for complete search history.

(56) References Cited

U.S. PATENT DOCUMENTS 6,195,701 B1    2/2001  Kaiserswerth et al.
9,419,620 B2 *  8/2016  Susnow ........... H03K 19/17732
                        (Continued)

FOREIGN PATENT DOCUMENTS

EP           2799983 A1    11/2014
EP           3015995 B1     3/2017
WO    WO 2015185505 A1    12/2015

OTHER PUBLICATIONS

Duelks et al.; "A Real-Time Test and Simulation Environment Based on Standard FPGA Hardware"; 2009 Testing: Academic and Industrial Conference—Practice and Research Techniques; 2009; pp. 197-204; 2009 IEEE Computer Society; USA.

(Continued)

*Primary Examiner* — Ernest Unelus
(74) *Attorney, Agent, or Firm* — Muncy, Geissler, Olds & Lowe, P.C.

(57) ABSTRACT

A number of software routines comprising at least two software routines are created for an interface unit of a computer system having a first and a second interface processor for forwarding input data from a peripheral to a processor of the computer system on which software is programmed. A first subset of the software routines is assigned to a first category provided for task-synchronous data transfer, and a second subset of the software routines are assigned to a second category provided for continuous data transfer. The first interface processor is programmed with the first subset and the second interface processor with the second subset of software routines. During execution of the software, the first subset is cyclically executed by the first interface processor at a first cycle rate, and the second subset is cyclically executed by the second interface processor at a second cycle rate.

13 Claims, 4 Drawing Sheets

(51) Int. Cl.
*G06F 9/445* (2018.01)
*G06F 15/78* (2006.01)
*G06F 15/76* (2006.01)

(52) U.S. Cl.
CPC ........ *G06F 13/102* (2013.01); *G06F 13/4243* (2013.01); *G06F 15/76* (2013.01); *G06F 15/7867* (2013.01)

(56) References Cited

U.S. PATENT DOCUMENTS

| | | |
|---|---|---|
| 2014/0324408 A1 | 10/2014 | Merten et al. |
| 2016/0267111 A1* | 9/2016 | Shoaib .................... G06T 1/20 |
| 2016/0335203 A1 | 11/2016 | Sauer et al. |
| 2017/0220391 A1 | 8/2017 | Claes |
| 2018/0101502 A1* | 4/2018 | Nassif .................. G06F 9/3869 |

OTHER PUBLICATIONS

Yosinaga et al.; "Utilizing Multi Networks Task Scheduler for Streaming Applications"; International Conference on Parallel Processing—Workshops; 2008; pp. 25-30; 2008 IEEE Computer Society.

Krueger et al.; "A Comparison of Preemptive and Non-Preemptive Load Distributing"; Comparer Sciences Department University of Wisconsin-Madison; Madison, WI 530706; pp. 123-130; 1988 IEEE.

Dedicating one core to hard realtime tasks—Raspberry Pi Forums; Jun. 17, 2015; https://www.raspberrypi.org/forums/viewtopic.php?f=72&t=113423.

* cited by examiner

METHOD FOR THE PARALLEL MANAGEMENT OF CONTINUOUS AND TASK-SYNCHRONOUS INPUT DATA OF A REAL-TIME SYSTEM

This nonprovisional application claims priority under 35 U.S.C. § 119(a) to European Patent Application No. 17175193.6, which was filed in the European Patent Office on Jun. 9, 2017, and which is herein incorporated by reference.

BACKGROUND OF THE INVENTION

Field of the Invention

The present invention relates to interface units for data exchange between a computer system and a peripheral.

Description of the Background Art

In the development of security-critical embedded systems, for example, of control devices for use in automobiles, aircraft, industrial robots, or medical devices, it is common practice to test their proper functioning using a real-time computer system prior to the mass production of an embedded system. In a hardware-in-the-loop test, HIL test for short, the computer system emulates an environment of the embedded system. In this case, the computer system reads the control signals output by the embedded system, calculates input signals for the embedded system based on hard real time, and feeds the input signals into its data inputs. The embedded system accordingly operates in a largely virtual environment in which it can be tested safely and under reproducible conditions.

A test procedure complementary thereto is Rapid Control Prototyping, RCP for short. Here, the computer system assumes the role of the embedded system itself. The computer system in this case is generic hardware programmed with prototype control software so as to check the control software for correct functioning in a real environment, for example, a test vehicle on a test track.

In both scenarios, the data exchange with a peripheral in hard real time is an indispensable function of the computer system. The mediation between the peripheral and the central processor of the computer system is assumed by an interface unit, which is usually designed as a pluggable I/O card. More recently, a demand has been apparent for ever larger real-time computer systems comprising a large number of interface units. In systems of this type, it makes sense to equip the interface units with programmable processors to relieve the central processor and to outsource functionalities for controlling the interface units, for preprocessing the input data, inter alia, in the interface units.

European Patent EP 3 015 995 B1, which corresponds to US 2016/0335101, which is incorporated herein by reference, discloses a correspondingly designed interface unit. In order to design the forwarding of input data to the central processor with low latency and low jitter, the patent proposes providing a number of parallel computing interface processors on the interface unit. Each interface processor required in the current test scenario is uniquely assigned to a task on the central processor. Each task writes the software routines for programming the interface processors themselves, merges them into compact command sequences, and programs the interface processors assigned to them with the command sequences. The compact command sequences are normally executed completely by the interface processors and cannot be interrupted.

The approach in other conventional art, however, is problematic when the interface unit is to be configured for transmitting a continuous data stream to a task. The interface processors are configured for the task-synchronous data transfer. The term "task-synchronous" can be understood as meaning that the execution of the software routines on an interface processor is synchronized with the task for which the software routines programmed on the respective interface processor were created and for which the software routines work on input data. For example, if a task is executed on the central processor at a particular cycle rate, for example, 1000 times per second, then the cycle rates of the interface processors assigned to the task are selected so that in each cycle the current input data, which are expected by the task, for reading are available to the task. To ensure this, each cycle of an interface processor assigned to the task may be triggered by a trigger signal which may be initiated by an independent timer or by the task itself.

In contrast, continuous data transfer can mean that an interface processor forwards input data, stored in a data input port, to the central processor without consideration of the cycle rate of a task executed on the central processor. The skilled artisan is familiar with this type of data transfer as streaming. Basically, streaming means that data are transferred from a transmitter to a receiver at a high throughput rate, and the transmitter performs the transfer continuously and regardless of the receiver. The receiver itself is responsible for processing the data sufficiently quickly. In the HIL and RCP fields of application, the continuous, i.e., streamed, data transfer is particularly useful for the reading of signals whose values change so rapidly that the cycle rate of the task evaluating the respective signal is not sufficient for sampling the signal. Coupling the reading of a sensor signal to the cycle rate of the reading task may result in subsampling of the sensor signal if its temporal dynamics are correspondingly high. Therefore, the transfer of sensor signals of this type should be carried out regardless of the task processing them at a data rate that ensures a sufficiently fast sampling of the sensor signal.

This requirement is not obviously compatible with the conventional art, because it provides for the software routines, intended for transferring input data, to be combined into compact command sequences prior to the loading of the software routines onto an interface processor and for the compact command sequences to be executed completely and without interruption in each cycle. Accordingly, it is not possible to define different cycle times for the software routines combined into a command sequence on an interface processor. If a task is to process both task-synchronously and continuously transmitted measured values.

SUMMARY OF THE INVENTION

It is therefore an object of the present invention to provide a programmable interface unit that enables parallel transfer of task-synchronous and continuous input data from a peripheral to a processor of a computer system in a low-latency and low-jitter manner. In particular, it is an object of the invention to configure the interface unit for the continuous transfer of input data without worsening the jitter or the latency of the interface unit.

Accordingly, the subject of the invention is a method for managing input data of a computer system by means of an interface unit comprising at least one first interface processor and a second interface processor. Each interface processor is programmable and configurable by the programming to read, optionally to preprocess, an input data, stored in a data input port of the interface unit, by a peripheral of the computer system, and to store it at a memory address readable by a processor of the computer system not installed in or on the interface unit. The storing can be carried out directly by a write access of an interface processor to the memory address readable by the processor of the computer system. Alternatively, the storage can also take place indirectly in that an interface processor does not itself write to the memory address readable by the processor of the computer system but initiates the storage of the input data at the memory address by a component of the computer system.

The term "interface processor" should not be understood as an established technical term. In the present example, it is merely used to describe the intended use of the processor designated by the term within the scope of the invention. The term in itself does not imply any technical specifications regarding processor architecture or technical measures, unless such implications are expressly stated.

A first data link is set up between the peripheral and the number of data input ports, and the peripheral is configured to store input data by means of the first data link in at least one data input port. A second data link is set up between the interface unit and the processor of the computer system for storing input data at a memory address readable by the processor of the computer system.

The processor of the computer system is programmed with software that comprises at least one first task configured to process input data forwarded by the interface unit. Software routines are created and loaded onto the interface processors to configure the interface unit for forwarding input data to the first task. In this case, according to the invention, at least two software routines are created, each of which is configured to program an interface processor to read an input data from a data input port of the interface unit and to store the input data at a memory address readable by the processor of the computer system. Optionally, each software routine may be additionally configured to manipulate the input data by preprocessing before storage.

To solve the problem underlying the invention, software routines for continuous and task-synchronous data transfer to the interface unit are to be separated from one another, so that a particular interface processor or at least one single core of an interface processor forwards input data either task-synchronously or continuously. For this purpose, before the programming of the interface processors, a first subset of the created software routines is assigned to a first category and a second subset of the created software routines is assigned to a second category. The first interface processor is programmed with the first subset and the second interface processor with the second subset of software routines.

After the programming of the interface processors has been completed, the execution of the software by the processor of the computer system is started. With the start of the execution of the software, the execution of the software routines is started by the interface processors, and hereafter, parallel to the execution of the software, the software routines are executed cyclically by the interface processors. In this case, the first interface processor is configured to execute the first subset at a first cycle rate, and the second interface processor is configured to execute the second subset at a second cycle rate. Both the first and second interface processor work on the first task; i.e., the first task is configured to read and process the input data, stored by the first subset and by the second subset, during the execution of the software.

An important feature of the invention, therefore, is that the software routines provided for the interface processors are already divided into two categories before being downloaded to the interface processors. Depending on whether a software routine is intended for task-synchronous or for continuous data transfer, it is assigned to the first or second category, and the software routines of the first and second category are loaded onto different interface processors. Accordingly, the cyclic execution of the software routines on the first and second interface processors is performed at different cycle rates. For example, the first cycle rate is selected synchronously to the cycle rate of the first task. This is to be understood in particular as a selection of the first cycle rate, which ensures that the first task in each cycle finds the input data which the first interface processor is configured to store by its programming, and that these input data are overwritten with current values exactly once per cycle of the first task. For this purpose, for example, any new execution of the first subset may be initiated by a programmable timer located inside or outside the first interface processor. Another possibility is that the first task causes a trigger signal to be sent to the first interface processor once per cycle and the first interface processor is configured to start a new execution of the first subset in response to the trigger signal.

In contrast, the second interface processor is provided to continuously transfer input data from at least one data input port. Accordingly, the second cycle rate can be selected synchronously to a data storage rate at which input data are stored in a data input port from which the second interface processor reads input data based on its programming. For example, the second cycle rate can be selected such that input data stored at a higher data storage rate than the cycle rate of the first task in a data input port are completely forwarded by the second interface processor and stored in a readable format for the first task. Accordingly, the reading and storing of the input data by the second processor are independent of the cycle rate of the first task, and the first task finds in each cycle of the first task all input data stored in the data input port after completion of the respective last cycle. For example, the second cycle rate can be selected synchronously to a data storage rate at which an analog-to-digital converter stores measured values read by a sensor in the data input port.

A cycle of a task can be understood as a final execution of the task after a cyclically repeated call of the task. An interface processor cycle is to be understood as a final execution of a number of software routines, programmed on the interface processor, after a cyclically repeated call of the interface processor, in particular a call by a trigger signal. A cycle rate is to be understood as an average number of cycles per unit time. The time interval between two consecutive cycles, in particular of an interface processor, is not necessarily constant.

The method is particularly advantageous if the interface processors are configured to execute the software routines programmed on them in each interface processor cycle in their entirety and without interruption. In EP 3 015 995 B1, for example, this is achieved by combining the software routines created for an interface processor into a compact, uninterruptible sequence of machine instructions prior to their programming on the interface processor and by configuring the interface processors to completely execute the respective sequence in each cycle and thereby to execute each machine instruction contained in the sequence at most once. It follows that all software routines loaded on an interface processor are inevitably executed at the same cycle rate.

Following the teaching of EP 3 015 995 B1, it is further preferred that the software on the processor of the computer system comprises at least one second task, which reads and processes the input data from the peripheral, and that the first and second task are each assigned at least one interface processor. This assignment can be understood such that the input data stored by an interface processor assigned to a task are read exclusively by the task to which the interface processor is assigned. It is provided in this embodiment that the interface processors assigned to the first and second task, in particular all interface processors assigned to a task, are programmed with software routines of the first category, and that the software routines of the second category are programmed and distributed to interface processors that are not assigned to any task. The interface processors assigned to a task can be programmed exclusively with software routines of the first category, and the interface processors not assigned to any task are exclusively programmed with software routines of the second category or are not programmed at all.

The advantage of this embodiment of the invention is its good compatibility with the teaching of EP 3 015 995 B1. According to the teaching of the cited patent, the software routines of the first category provided for task-synchronous data transfer can be distributed to the interface processors, and the software routines of the second category provided for continuous data transfer can be distributed in a subsequent process step to the interface processors that are not used for the task-synchronous data transfer. In this way, an interface unit programmed according to the cited patent can be configured for continuous data transfer, wherein the advantages regarding jitter and latency achieved by the teaching of the cited patent are retained.

The software routines for programming interface processors for storing the input data for the reading of which the first task is configured can be created by the first task and that the first task assigns each software routine it has created to the first category or the second category, and that, in an analogous manner, the second task as well, in particular each task set up to read input data from the peripherals, creates its software routines itself and assigns them respectively to the first or second category.

The distribution of the software routines of the second category to the interface processors not assigned to any task is preferably not arbitrary but takes into account the requirements of the interface unit with regard to its real-time suitability. Due to the generally high throughput rate of continuous data streams, the interface processors programmed with software routines of the second category generally operate at a high cycle rate, which, with careless programming, can easily lead to overloading of individual interface processors.

In order to prevent this, in an embodiment, an acceptable readout time is defined for each interface processor which is programmed with software routines of the second category or is provided for programming with software routines of the second category. The acceptable readout time of an interface processor is a maximum period of time for executing the entirety of all second category software routines programmed on the interface processor. In a simple version, the maximum readout time for all interface processors is fixedly predetermined as identical. For example, the maximum readout time can be based on the maximum data rate at which input data can be stored in a data input port. In a further embodiment, the maximum readout time can be flexibly defined for each interface processor, for example, by a user using configuration software. The software routines of the second category are then distributed to the interface processors such that for each interface processor programmed with software routines of the second category, the maximum processing time of the entirety of all software routines of the second category programmed on the interface processor is less than the acceptable readout time of the interface processor. The distribution of the software routines of the second category occurs particularly advantageously such that the maximum processing time is less than the acceptable readout time minus a temporal uncertainty, which may be due to jitter of the interface processor, for example.

The maximum processing time is the maximum period of time that an interface processor requires to execute all second category software routines programmed on the interface processor. The maximum processing time of an interface processor is predictable when the clocking of the interface processor and the maximum number of processor commands to be executed in one cycle are known. This last condition is met when every software routine programmed on an interface processor is executed exactly once and the software routines do not contain any loops or returns.

Basically, the software routines of the second category can be distributed manually or automatically to the interface processors. If the acceptable readout time is defined identically for all interface processors, or at least for all interface processors available for programming with software routines of the second category, then an automatic distribution can take place such that a software distribution routine attempts to distribute the software routines of the second category as evenly as possible to the interface processors, so that the difference between the largest and smallest maximum processing time of all interface processors programmed with software routines of the second category is minimal.

A flexible definition of the acceptable readout times of the interface processors takes place particularly advantageously such that a user defines an acceptable readout time for individual data input ports of the interface unit, for example, by means of configuration software. The acceptable readout time value that makes sense for a given data input port can depend, for example, on the speed at which hardware, e.g., an analog-to-digital converter, stores data in the data input port. The acceptable readout time defined for the data input ports is then inherited by the interface processors. The inheritance can take place, for example, such that the acceptable readout time of each interface processor programmed with software routines of the second category is selected equal to the smallest acceptable readout time of all data input ports from which the interface processor reads input data based on its programming. Generally, for each interface processor programmed with software routines of the second category, it must be checked whether the maximum processing time of the respective interface processor is less than the acceptable readout time of all data input ports from which the interface processor reads input data based on its programming.

Manual distribution of the software routines of the second category can take place by means of a configuration software that, for example, provides a graphical user interface for the manual distribution of the software routines of the second category. The configuration software can give a user feedback on the number of interface processors still available for the software routines of the second category after programming of the interface unit with the software routines of the first category, on the number of software routines of the second category to be distributed to the interface processors, and on the processing time of each software routine of the second category. Particularly advantageously, the configuration software also provides feedback on the acceptable readout time of each available interface processor or at least provides feedback if the processing time of all second category software routines provided for programming on an interface processor is greater than the acceptable readout time of the interface processor, in particular minus the temporal uncertainty.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
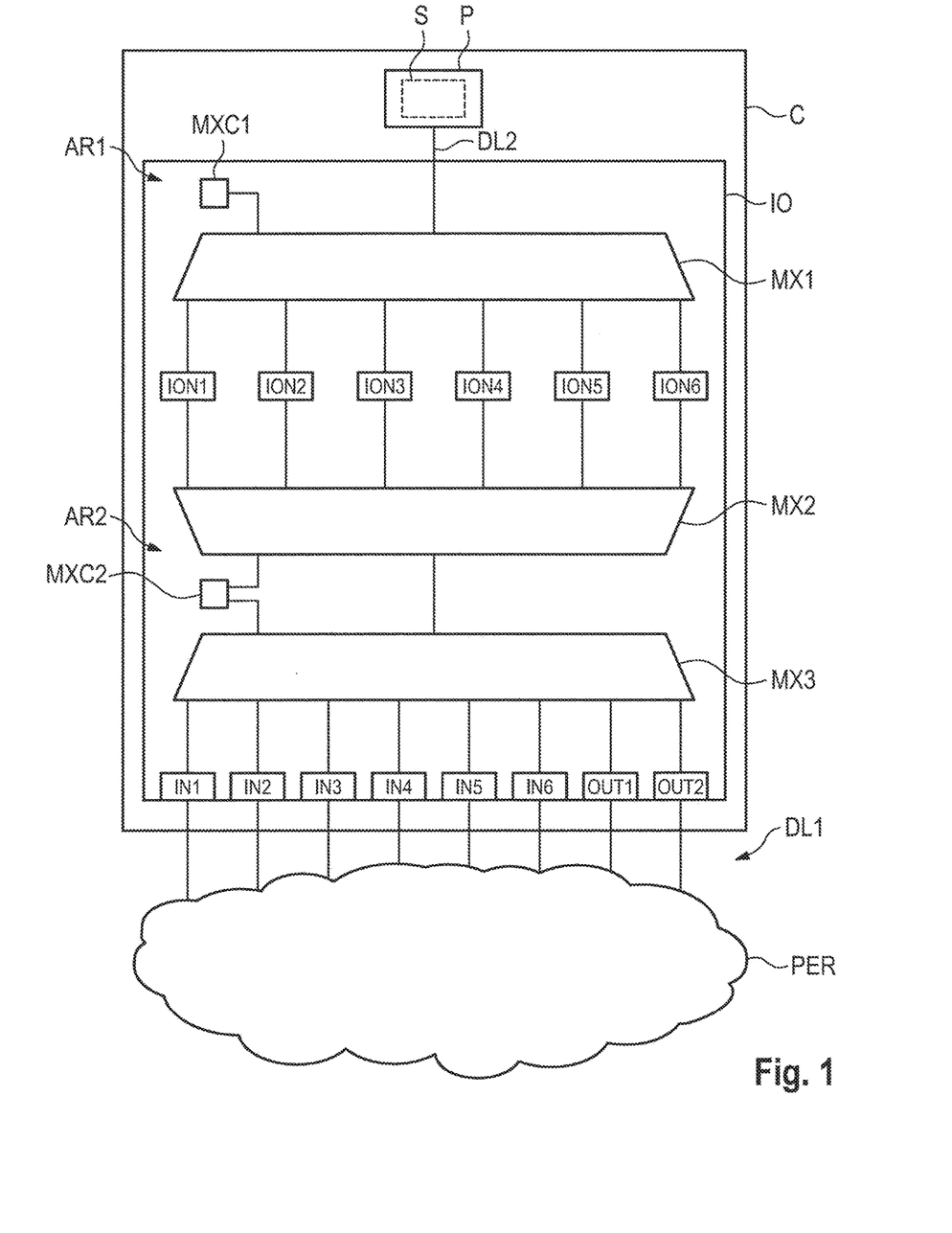
FIG. 1 shows a computer system with an interface unit configured to carry out the method.

The illustration in FIG. 1 shows a computer system C, known from the prior art, comprising a processor P and an interface unit 10 which connects computer system C to a peripheral PER and is configured to forward input data from peripheral PER to processor P and to forward output data from processor P to peripheral PER. The interface unit comprises, by way of example, eight data ports, six of which are set up as data input ports IN1, . . . , IN6 and two as data output ports OUT1, OUT2. A first data link DL1, comprising a plurality of data cables, connects data input ports IN1, . . . , IN6 and data output ports OUT1, OUT2 to peripheral PER. By means of first data link DL1, input data can be stored by peripheral PER in data input ports IN1, . . . , IN6, and output data stored in data output ports OUT1, OUT2 can be read by peripheral PER.

Interface unit 10 comprises, by way of example, six programmable interface processors ION1, . . . , ION6, each comprising a single processor core. A second data link DL2 connects interface processors ION1, . . . , ION6 to processor P. A first arbiter AR1, comprising a first control unit MXC1 and a first multiplexer MX1, mediates the access of interface processors ION1, . . . , ION6 to second data link DL2. In order to obtain access to second data link DL2, each interface processor ION1, . . . , ION6 must request access from control unit MXC1. First multiplexer MX1 is set up to give one of the interface processors access to second data link DL2, and first control unit MXC1 is configured to control first multiplexer MX1, to register a request for access to second data link DL2, and to grant access to the second data link to the requesting interface processor by means of first multiplexer MX1. A priority is stored in first control unit MXC1 for each interface processor ION1, . . . , ION6 programmed with at least one software routine, and first control unit MXC1 is configured to grant access first to the interface processor with the higher priority, if there is a request from two interface processors for access to second data link DL2.

A second arbiter AR2 comprises a second control unit MXC2, a second multiplexer MX2, and a third multiplexer MX3 and mediates the access of interface processors ION1, . . . , ION6 to data input ports IN1, . . . , IN6 and data output ports OUT1, OUT2. Second multiplexer MX2 and third multiplexer MX3 are set up to give one of interface processors ION1, . . . , ION6 access to one of data ports IN1, . . . , IN6, OUT1, OUT2. In order to obtain access to one of the data ports, each of interface processors ION1, . . . , ION6 must request access from second control unit MXC2, and second control unit MXC2 is configured to control second multiplexer MX2 and third multiplexer MX3, to register a request for access to one of data ports IN1, . . . , IN6, OUT1, OUT2, and to grant access to the requesting interface processor ION1, . . . , ION6 by means of second multiplexer MX2 and third multiplexer MX3. The priorities stored on first control unit MXC1 are also stored identically on second control unit MXC2, and second control unit MXC2 is configured to grant access first to the interface processor with the higher priority, if there is a request from two interface processors for access to data ports IN1, . . . , IN6, OUT1, OUT2.

A software S which exchanges data with peripheral PER is programmed on processor P; in other words, it reads and processes input data stored by peripheral PER, calculates output data for peripheral PER, and stores them for reading by peripheral PER.

Figure 2:
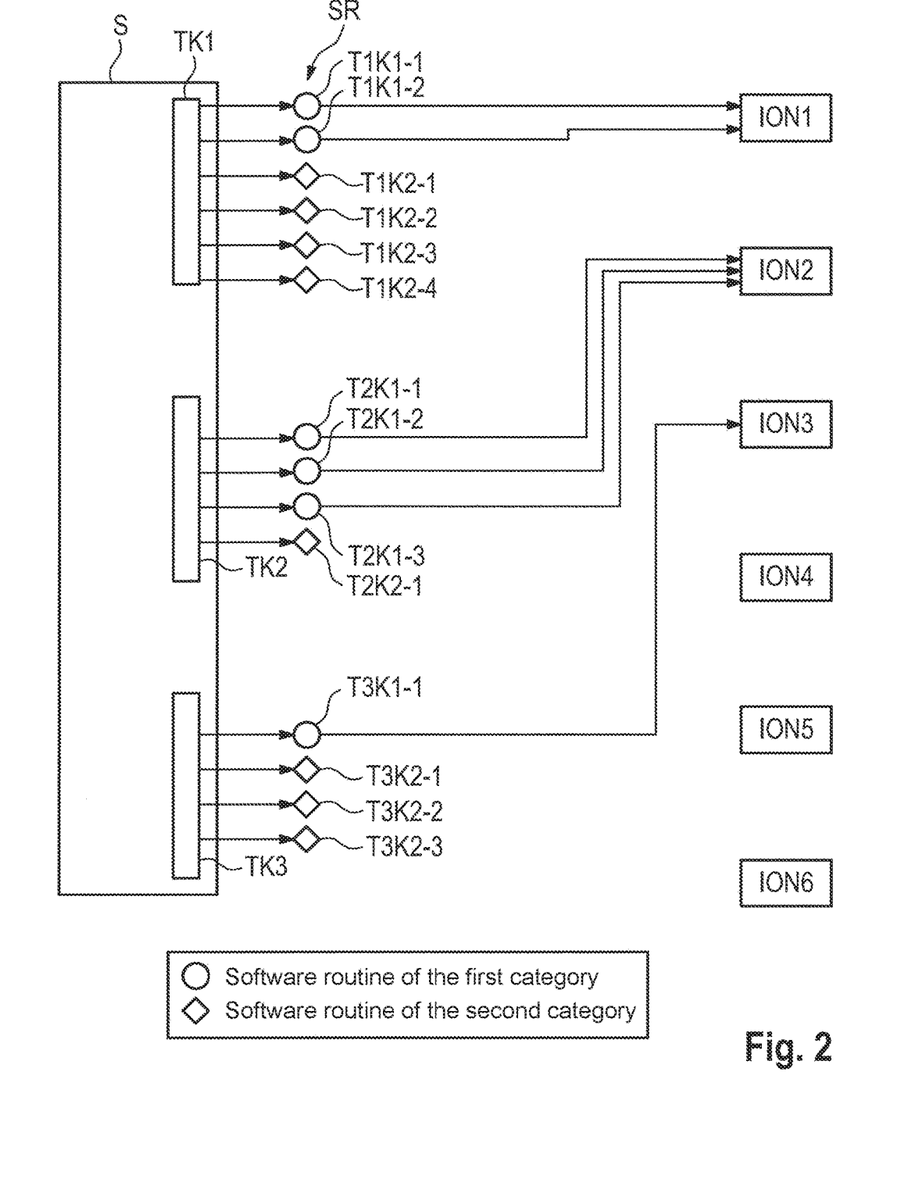
FIG. 2 is a diagram of the creation of the software routines and the distribution of software routines of the first category to the interface processors.

The illustration in FIG. 2 shows that software S on processor P of computer system C comprises, by way of example, three tasks TK1, TK2, TK3, which exchange data with peripheral PER. In a first process step, the tasks TK1, . . . , TK3 create software routines SR for programming at least some of interface processors ION1, . . . , ION6 with software routines SR, wherein each task TK1, . . . , TK3 assigns each software routine, created by the respective task, to either a first category or a second category. Software routines of the first category are shown symbolically as circles and are intended for task-synchronous data transfer. Software routines of the second category are shown symbolically as diamonds and are intended for continuous data transfer.

By way of example, a first task TK1 creates two software routines T1K1-1, T1K1-2 of the first category and four software routines T1K2-1, T1K2-4 of the second category. A second task TK2 creates three software routines T2K1-1, . . . , T2K1-3 of the first category and a software routine T2K2-1 of the second category. A third task TK3 creates a software routine T3K1-1 of the first category and three software routines T3K2-1, . . . , T3K2-3 of the second category.

The software routines SR are written by tasks TK1, . . . , TK3 in the high-level language C++ in order to enable users to write their own software routines for programming interface processors ION1, . . . , ION6. Each software routine comprises at least one memcpy32 command to read an input data from a data input port IN1, . . . , IN6 and to store it at a memory address readable by processor P or to read an output data from a memory address writable by processor P and to store it in a data output port OUT1, OUT2. Each software routine may optionally include further commands for pre- or post-processing input data or output data before forwarding, for example, scaling, providing with a direct component, calculating, or processing by logical operations. Furthermore, each software routine comprises a check as to whether data are stored at the memory address to be read, and the commands for reading the data and for their pre- and post-processing are executed only if this is the case.

Each software routine SR is compiled for interface processors ION1, . . . , ION6, i.e., translated into a sequence of machine instructions interpretable and executable by the interface processors. The compiled software routines are loaded onto the interface processors. Software routines which are loaded together on an interface processor are combined, as described in EP 3 015 995 B1, before the loading process in each case into a compact sequence of machine instructions, which comprise each software routine included in the sequence as a coherent subsequence, and the interface processors are configured to execute the sequences in their entirety and without interruption.

Each task TK1, . . . , TK3 of the software S, which is configured to exchange data with peripheral PER, is uniquely assigned at least one interface processor ION1, . . . , ION6. By way of example, a first interface processor ION1 is assigned to first task TK1, a second interface processor ION2 to second task TK2, and a third interface processor ION3 to third task TK3. The software routines of the first category, which were created by a specific task TK1, . . . , TK3, are loaded exclusively on the interface processors assigned to the respective task. Accordingly, the software routines of the first category T1K1-1, T1K1-2 created by first task TK1 are loaded onto first interface processor ION1, the software routines of the first category T2K1-1, . . . , T2K1-3 created by second task TK2 are loaded onto second Interface processor ION2, and the software routines of the first category T3K1-1 created by second task TK3 are loaded onto third interface processor ION3.

Each interface processor ION1, . . . , ION6, which is assigned to a task TK1, . . . , TK3, is uniquely assigned to the task (i.e., it is programmed exclusively with software routines created by the task to which it is assigned), the input data stored by the interface processor are read exclusively by the task to which it is assigned, and the output data read by it were stored exclusively by the task to which it is assigned. A clear assignment is not necessarily provided in the opposite direction. If necessary, more than one interface processor ION1, . . . , ION6 can be assigned to a task TK1, . . . , TK3.

The described distribution of the software routines of the first category corresponds to the procedure described in the patent EP 3 015 995 B1. The invention disclosed in the cited patent accordingly results as a special case of the presently described invention for the case that no software routine SR is assigned to the second category.

Figure 3:
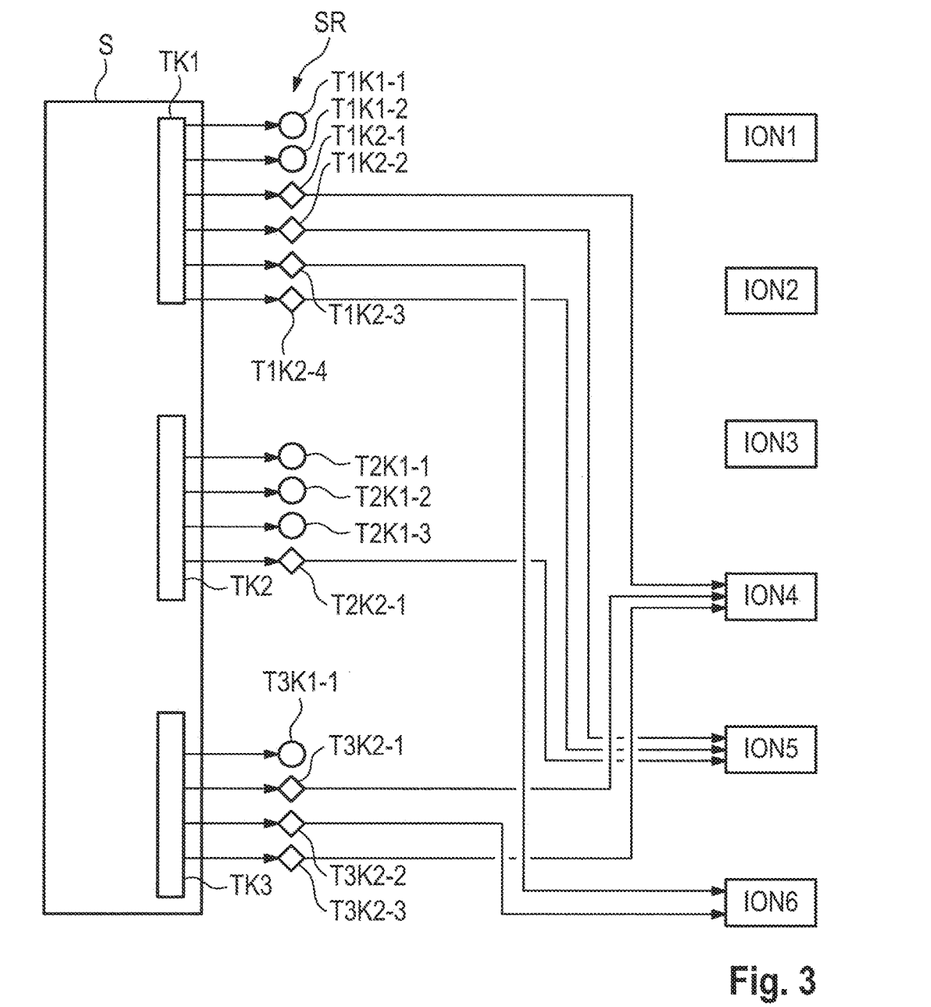
FIG. 3 is a diagram of the distribution of software routines of the second category to the interface processors.
Figure 4:
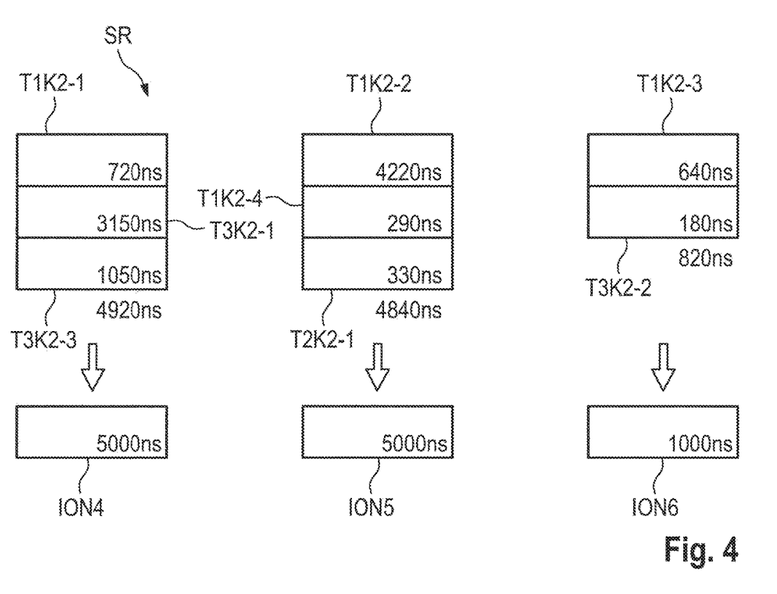
FIG. 4 is a diagram of the distribution of software routines of the second category to the interface processors, with consideration of processing times.

The illustrations in FIGS. 3 and 4 provide an outline of the distribution of software routines SR of the second category. As shown in FIG. 3, the software routines SR of the second category are distributed to the interface processors that, after the assignment of interface processors to tasks TK1, . . . , TK3, were not assigned any task of software S in the illustrated case therefore to fourth interface processor ION4, fifth interface processor ION5, and sixth interface processor ION6. As is evident from the illustration, in the distribution of the software routines SR of the second category there is no special assignment of interface processors ION1, . . . , ION6 to tasks TK1, . . . , TK3 of software S on processor P. Software routines SR of the second category created by different tasks TK1, . . . , TK3 are programmed on one and the same interface processor ION4, . . . , ION6. Accordingly, input data stored by an interface processor ION4, . . . , ION6 programmed with software routines SR of the second category are generally read by different tasks TK1, . . . , TK3 and output data read by an interface processor ION4, . . . , ION6 programmed with software routines SR of the second category were generally stored by different tasks TK1, . . . , TK3. Nevertheless, the individual software routines SR of both the first and second category are each uniquely assigned to a task. In the specific example, each software routine SR is uniquely assigned to task TK1, . . . , TK3, which the software routine has created. Input data stored by a specific software routine SR of the first or second category are read only by a single task TK1, . . . , TK3, and output data read by a specific software routine SR of the first or second category were previously stored only by a single task TK1, . . . , TK3.

Software routines SR of the second category loaded onto a common interface processor ION4, . . . , ION6 are created in C++ before the loading process in the same way as the software routines SR of the first category, compiled, and combined into compact sequences of machine instructions prior to loading.

The illustration in FIG. 4 outlines the criteria according to which the software routines SR of the second category are distributed to interface processors ION4, . . . , ION6. The software routines of the second category are shown as rectangles in the top part of the picture. For each software routine SR of the second category, a maximum processing time is determined, which is indicated in each case in the lower right corner of the rectangles. The software routines are designed such that each machine instruction of a software routine is executed by the interface processor at most once per cycle of an interface processor ION1, . . . , ION6, and interface processors ION1, . . . , ION6 are configured to execute the compact sequences loaded on them only once per cycle and without interruption. Accordingly, the maximum processing time of a software routine results from the number of machine instructions in the software routine and the clocking of interface processors ION1, . . . , ION6.

The interface processors available for programming with software routines SR of the second category, therefore, fourth interface processor ION4, fifth interface processor ION5, and sixth interface processor ION6, are shown as rectangles in the bottom part of the figure. An acceptable readout time is determined for each of these interface processors, or the acceptable readout time is fixedly predefined as a constant value. An embodiment is shown in which the maximum readout time for each interface processor can be specified flexibly. For fourth interface processor ION4 and fifth interface processor ION5, an acceptable readout time of 5000 ns (5000 nanoseconds) was determined in each case, and for sixth interface processor ION6 an acceptable readout time of 1000 ns. The acceptable readout time is understood to be a period of time during which the reading, preprocessing, and storage of the input data and output data forwarded by the interface processor must be completed. Equivalently, the acceptable readout time can be understood to be a maximum period of time that can be taken up at the maximum by the complete execution of the software routines programmed on an interface processor within a cycle.

The distribution of software routines SR of the second category to interface processors ION4, ..., ION6 available for the distribution takes place in such a way that on each interface processor ION4, ..., ION6 programmed with software routines SR of the second category, the maximum processing time of the entirety of all software routines SR programmed on interface processors ION4, ..., ION6 is less than the acceptable readout time. The maximum processing time of software routines T1K2-1, T3K2-1, T3K2-3, programmed on fourth interface processor ION4, amounts to a total of 4920 ns; the maximum processing time of software routines T1K2-2, T1K2-4, T2K2-1, programmed on fifth interface processor ION5, amounts to a total of 4840 ns; and the maximum processing time of software routines T1K2-3, T3K2-2, programmed on sixth interface processor ION6, amounts to a total of 820 ns. Accordingly, it is ensured for each interface processor ION4, ..., ION6 programmed with software routines SR of the second category that the interface processor completes the execution of the software routines programmed on it within the acceptable readout time.

The acceptable readout time of an interface processor ION1, ..., ION6 must be selected such that the complete execution of software routines SR of the second category programmed on the interface processor is ensured during the execution of software S. The maximum processing time, therefore, must not be greater than the cycle rate of the respective interface processor. It is advantageous to include a temporal uncertainty as well for the maximum processing time, i.e., to maintain a certain interval to the acceptable readout time when determining the maximum processing time. The temporal uncertainty may correspond, for example, to a jitter of the interface processor.

The acceptable readout time can be set, for example, by means of a configuration software before the software S execution is begun and should be selected for each interface processor ION1, ..., ION6 such that the respective interface processor completely transmits the input data which are stored in the data input ports IN1, ..., IN6 and which the respective interface processor reads based on its programming. The cycle rate of an interface processor ION1, ..., ION6 programmed with software routines SR of the second category is therefore advantageously synchronized with a data storage rate with which input data are stored in a data input port from which the second interface processor reads input data based on its programming. This is not necessarily to be understood that the cycle rate of the interface processor is selected as equal to the data storage rate of the input data. When the interface processor transmits the input data as a packet, for example, a fraction of the data storage rate is sufficient as a cycle rate for the interface processor.

In a simpler embodiment, the acceptable readout time cannot be set flexibly but is fixedly predefined and can be based, for example, on a maximum data storage rate with which input data can be stored in a data input port IN1, ..., IN6. In principle, the distribution of software routines SR of the second category can occur automatically or manually. In the case of the manual distribution, for example, the illustration in FIG. 4 could be a model for a graphical user interface, by means of which software routines SR of the second category can be allocated to interface processors ION1, ..., ION6, which are not assigned to any task TK1, ..., TK3, and which gives the user feedback for each of these interface processors whether the maximum processing time is less than the acceptable readout time.

The compiled software routines SR combined into compact sequences are loaded onto interface processors ION1, ..., ION6, and after the loading process is completed, the execution of software S and concurrently the execution of software routines SR are started by interface processors ION1, ..., ION6. Each interface processor is programmed exclusively with software routines SR of the first category or exclusively with software routines SR of the second category or with no software routine SR.

The cycle rate of each interface processor ION1, ..., ION3 programmed with software routines SR of the first category is equal to the cycle rate or equal to a fraction of the cycle rate of the respective task TK1, ..., TK3 assigned to the interface processor, so that the task comes upon new input data in every cycle or after a defined number of cycles. This type of data transfer is useful for sampling signals, for the sampling of which the cycle rate of the task is sufficient. For example, if the computer system C is an RCP system set up by software S to take over the function of an engine control unit, then the input data for monitoring the engine temperature, the position of the accelerator pedal, or the crankshaft angle may be stored by software routines of the first category.

The cycle rate of each interface processor ION4, ..., ION6 programmed with software routines SR of the second category is selected independently of the cycle rates of tasks TK1, ..., TK3. These interface processors transmit input data continuously rather than task-synchronously. This type of data transfer is useful for sampling signals for whose sampling the cycle rate of the tasks reading the input data is not sufficient. For example, for the RCP system, used by way of example, input signals for monitoring the cylinder internal pressures or the phase currents of an electric motor could be stored by software routines of the second category.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for managing input data of a computer system via an interface unit comprising at least one first interface processor and a second interface processor, the first and second interface processors of the interface unit being programmable and configurable by programming to read an input data stored in a data input port of the interface unit by a peripheral of the computer system and to store it at a memory address readable by a processor of the computer system or to read an input data stored in a data input port of the interface unit by the peripheral to preprocess the input data, and to store it at a memory address readable by the processor of the computer system, the method comprising:
  providing a first data link between the peripheral and a number of data input ports of the interface unit, the peripheral being configured to store input data via the first data link in at least one data input port out of the number of data input ports;
  providing a second data link between the interface unit and the processor of the computer system for storing input data at a memory address readable by the processor of the computer system by the interface unit;
  providing software that comprises at least one first task configured to process input data forwarded by the interface unit and is programmed on the processor of the computer system;
  creating a number of software routines comprising at least two software routines, the software routines being configured to program an interface processor to read an input data from a data input port of the interface unit and to store the input data at a memory address readable by the processor of the computer system or to program an interface processor to read an input data from a data input port of the interface unit to preprocess the input data and to store the input data at a memory address readable by the processor of the computer system;

assigning a first subset of the number of software routines to a first category provided for task-synchronous data transfer;

programming the first interface processor with the first subset;

assigning a second subset of the number of software routines to a second category provided for continuous data transfer;

programming the second interface processor with the second subset;

executing the software by the processor of the computer system;

executing, during the execution of the software by the processor of the computer system, the software routines cyclically by the interface processors, the first interface processor being configured to execute the first subset at a first cycle rate and the second interface processor being configured to execute the second subset at a second cycle rate; and configuring the first task to read and process the input data stored by the first subset and the second subset during the execution of the software by the processor of the computer system.

2. The method according to claim 1, wherein the first cycle rate is selected synchronously to the cycle rate of the first task and the second cycle rate is selected synchronously to a data storage rate at which the input data are stored in a data input port from which the second interface processor reads input data based on its programming.

3. The method according to claim 1, wherein the first interface processor is configured to execute the first subset in each cycle in its entirety and without interruption, wherein the second interface processor is configured to execute the second subset in each cycle in its entirety and without interruption, wherein the first subset and the second subset are each combined into a compact sequence of machine instructions, and wherein the first interface processor and the second interface processor are configured to execute or completely execute the respective sequence in each cycle and to execute each machine instruction contained in the sequence only once per cycle.

4. The method according to claim 1, wherein at least the first interface processor is assigned to the first task, wherein the interface processors assigned to the first task are programmed with software routines of the first category, wherein the input data stored by the interface processors assigned to the first task are read exclusively by the first task, wherein the software comprises a second task and at least one interface processor is assigned to the second task, wherein the interface processors assigned to the second task are programmed with software routines of the first category, wherein the input data stored by the interface processors assigned to the second task are read in exclusively by the second task, and wherein the software routines of the second category are programmed and distributed to interface processors that are not assigned to any task.

5. The method according to claim 4, wherein the interface processors assigned to a task are programmed exclusively with software routines of the first category, and wherein the interface processors not assigned to any task are exclusively programmed with software routines of the second category or are not programmed with any software routine.

6. The method according to claim 4, wherein the software routines for programming the interface processors to store the input data, for the readout of which the first task is configured, are created by the first task, wherein the first task assigns each software routine created by the first task to the first category or the second category, wherein the software routines for programming the interface processors to store the input data, for the reading of which the second task is configured, are created by the second task, and wherein the second task assigns each software routine created by the second task to the first category or the second category.

7. The method according to claim 4, wherein the software routines of the second category are distributed manually to the interface processors.

8. The method according to claim 4, wherein the software routines of the second category are distributed to the interface processors such that for each interface processor programmed with software routines of the second category, a maximum processing time of the entirety of all second category software routines programmed on the interface processor is less than an acceptable readout time defined before the start of the execution of the software routines.

9. The method according to claim 8, wherein the software routines of the second category are distributed to the interface processors such that the maximum processing time of each interface processor programmed with software routines of the second category is less than the acceptable readout time determined for the interface processor minus a timing uncertainty.

10. The method according to claim 8, wherein the acceptable readout time for all interface processors is predefined identically and the software routines of the second category are distributed to the interface processors automatically based on a software distribution routine such that of the interface processors programmed with software routines of the second category, a difference between the maximum processing time of the interface processor with a largest maximum processing time and the interface processor with a smallest maximum processing time is minimal.

11. The method according to claim 8, wherein for each data input port of the interface unit an individual acceptable readout time is defined via configuration software, wherein the software routines of the second category are manually distributed by a user to the interface processors, and wherein for each interface processor programmed by software routines of the second category, it is checked whether the maximum processing time of the respective interface processor is less than an acceptable readout time of all data input ports from which the interface processor reads input data based on its programming.

12. A computer system comprising:
 a processor;
 an interface unit comprising at least a first interface processor and a second interface processor, the first and second interface processors being programmable and configurable by programming to read an input data stored in a data input port of the interface unit by a peripheral of the computer system via a first data link and to store it at a memory address readable by the processor of the computer system or to read an input data stored in a data input port of the interface unit by the peripheral via the first data link, to preprocess the input data and to store it at a memory address readable by the processor of the computer system;

a second data link set up between the interface unit and the processor of the computer system for storing input data at a memory address readable by the processor of the computer system by the interface unit; and software that comprises at least one first task configured to process input data forwarded by the interface unit and is stored on the processor of the computer system, wherein the computer system is configured to create a number of two or more software routines and to configure each software routine to program an interface processor to read an input data from a data input port of the interface unit and to store the input data at a memory address readable by the processor of the computer system or to program an interface processor to read an input preprocess the input data and to store the input data at a memory address readable by the processor of the computer system, wherein the computer system is configured to assign a first subset of the number of software routines of a first category provided for task-synchronous data transfer and to program the first interface processor with the first subset, and to assign a second subset of the number of software routines to a second category provided for continuous data transfer and to program the second interface processor with the second subset, and to execute the software via the processor of the computer system during execution of the software to execute cyclically the software routines via the interface processors, wherein the first subset is executed on the first processor at a first cycle rate and the second subset is executed on the second processor at a second cycle rate, and wherein the first task is configured to read and process the input data, stored by the first subset and the second subset, during execution of the software.

13. The computer system according to claim 12, wherein the first cycle rate is selected synchronously to the cycle rate of the first task and the second cycle rate is selected synchronously to a data storage rate at which the input data are stored in a data input port from which the second interface processor reads input data based on its programming.

* * * * *